United States Patent
Schäfer et al.

(10) Patent No.: US 12,546,265 B2
(45) Date of Patent: Feb. 10, 2026

(54) CONTROL DEVICE FOR AN INTERNAL COMBUSTION ENGINE, INTERNAL COMBUSTION ENGINE ASSEMBLY INCLUDING AN INTERNAL COMBUSTION ENGINE AND A CONTROL DEVICE OF THIS TYPE, METHOD FOR OPERATING AN INTERNAL COMBUSTION ENGINE, AND METHOD FOR DETERMINING A COMPONENT CHARACTERISTIC MAP

(71) Applicant: Rolls-Royce Solutions GmbH, Friedrichshafen (DE)

(72) Inventors: Carsten Schäfer, Ravensburg (DE); Alexander Bernhard, Meckenbeuren (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 18/813,782

(22) Filed: Aug. 23, 2024

(65) Prior Publication Data

US 2024/0410323 A1 Dec. 12, 2024

Related U.S. Application Data

(63) Continuation of application No. PCT/EP2023/053532, filed on Feb. 13, 2023.

(30) Foreign Application Priority Data

Feb. 24, 2022 (DE) ..................... 10 2022 104 501.3

(51) Int. Cl.
*F02D 41/00* (2006.01)
*F02B 37/013* (2006.01)
(Continued)

(52) U.S. Cl.
CPC ........ *F02D 41/0007* (2013.01); *F02B 37/013* (2013.01); *F02B 37/18* (2013.01); *F02D 41/1401* (2013.01); *F02D 2041/1415* (2013.01)

(58) Field of Classification Search
CPC .............. F02D 41/007; F02D 41/1401; F02D 2041/1415; F02B 37/12–24
See application file for complete search history.

(56) References Cited

U.S. PATENT DOCUMENTS

| 7,748,217 B2 | 7/2010 | Müller |
| 9,885,297 B2 | 2/2018 | Wang et al. |

(Continued)

FOREIGN PATENT DOCUMENTS

| DE | 10 2015 216 261 A1 | 3/2017 |
| DE | 10 2018 213 641 A1 | 2/2020 |

OTHER PUBLICATIONS

International Search Report and the Written Notification from the International Research Authority dated May 19, 2023 for International Application No. PCT/EP2023/053532 (16 pages).

(Continued)

*Primary Examiner* — Loren C Edwards
(74) *Attorney, Agent, or Firm* — TAYLOR & EDELSTEIN, PC

(57) ABSTRACT

A control device for an internal combustion engine includes: a flow path module which is configured for: receiving a specified value for a flow path parameter of a flow path of the internal combustion engine; and determining a control specification for a control element of the flow path depending on the specified value using at least one component characteristic map of at least one component of the flow path.

15 Claims, 5 Drawing Sheets

(51) Int. Cl.
   *F02B 37/18*     (2006.01)
   *F02D 41/14*     (2006.01)

(56)           References Cited

U.S. PATENT DOCUMENTS

| | | | |
|---|---|---|---|
| 2002/0088226 A1* | 7/2002 | Haupt | F02D 41/0007 60/602 |
| 2009/0299673 A1 | 12/2009 | Padhye et al. | |
| 2015/0094939 A1 | 4/2015 | D'Amato et al. | |
| 2015/0184606 A1 | 7/2015 | Soejima et al. | |
| 2016/0131089 A1 | 5/2016 | Lahti et al. | |
| 2019/0120127 A1* | 4/2019 | Yashiro | F02D 41/0047 |
| 2020/0325817 A1* | 10/2020 | Heinken | F02D 23/00 |

OTHER PUBLICATIONS

"Validierung von Turboladerkennfeldern auf Heißgasprüfständen", Dipl.-Ing. Holger Mai et al., In: ATZ Extra, Step 2015, pp. 54-59 (6 pages).
English translation of "Validation of turbocharger maps on hot gas test benches", Dipl.-Ing. Holger Mai et al., In: ATZ Extra, Step 2015, pp. 54-59 (9pages).
"Turbine adapted maps for turbocharger engine matching", M. Tancrez, et al., Experimental Thermal and Fluid Science, 2011, pp. 146-153 (8 pages).

\* cited by examiner

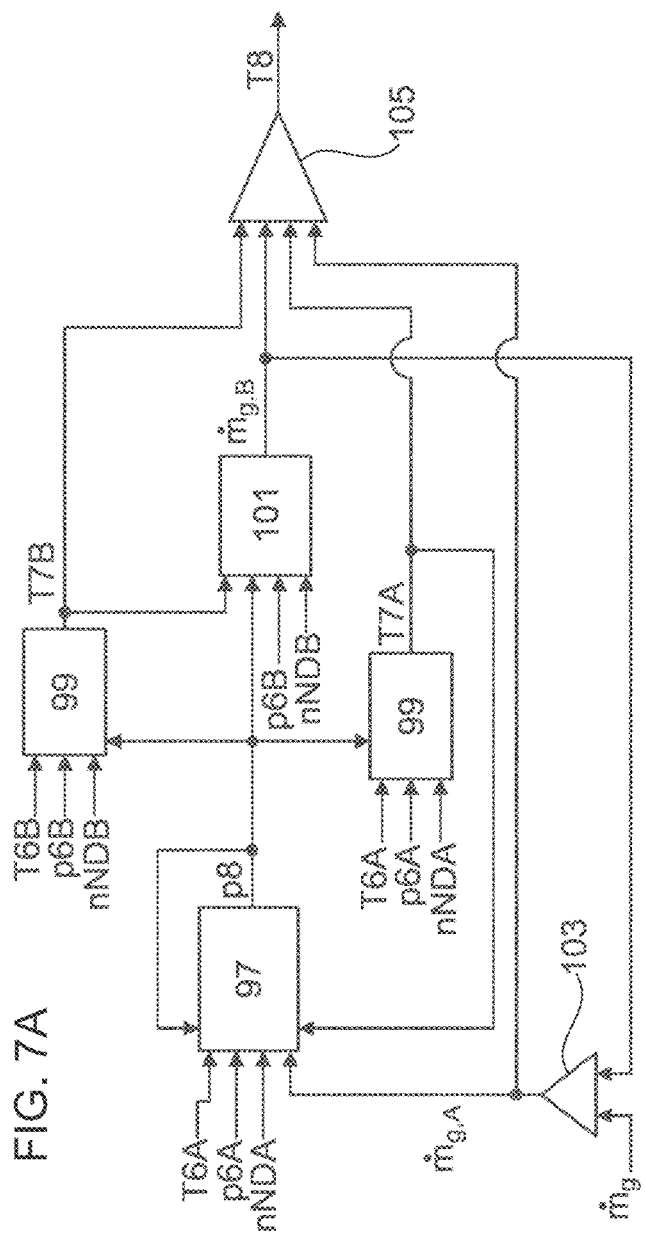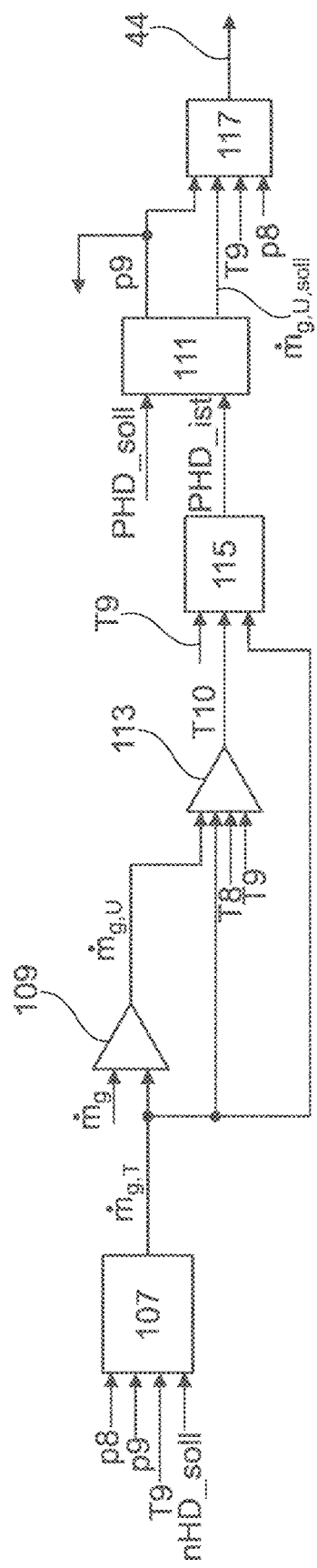

CONTROL DEVICE FOR AN INTERNAL COMBUSTION ENGINE, INTERNAL COMBUSTION ENGINE ASSEMBLY INCLUDING AN INTERNAL COMBUSTION ENGINE AND A CONTROL DEVICE OF THIS TYPE, METHOD FOR OPERATING AN INTERNAL COMBUSTION ENGINE, AND METHOD FOR DETERMINING A COMPONENT CHARACTERISTIC MAP

CROSS REFERENCE TO RELATED APPLICATIONS

This is a continuation of PCT application no. PCT/EP2023/053532, entitled "CONTROL DEVICE FOR AN INTERNAL COMBUSTION ENGINE, INTERNAL COMBUSTION ENGINE ASSEMBLY INCLUDING AN INTERNAL COMBUSTION ENGINE AND A CONTROL DEVICE OF THIS TYPE, METHOD FOR OPERATING AN INTERNAL COMBUSTION ENGINE, AND METHOD FOR DETERMINING A COMPONENT CHARACTERISTIC MAP", filed Feb. 13, 2023, which is incorporated herein by reference. PCT application no. PCT/EP2023/053532 claims priority to German patent application 10 2022 104 501.3, filed Feb. 24, 2022, which is incorporated herein by reference.

BACKGROUND OF THE INVENTION

1. Field of the Invention

The present invention relates to internal combustion engines, and, more particularly, to control devices for internal combustion engines.

2. Description of the Related Art

To control an internal combustion engine, characteristic maps measured on the multicylinder engine can be used, which must be determined in a multitude of tests on a test bench. This is time-consuming and expensive and must be performed again for each new type of internal combustion engine or—if the control system is to be very precise—even for each individual combustion engine. If the operation of the combustion engine is to be regulated, a nonlinear system requires either linearization or storage of operating point-dependent control parameters. Parameterization of these control parameters is also very time-consuming and must be performed every time for each new type of internal combustion engine; the parametrization therefore requires immense effort and also test bench time. The parameterization required for linearization is also time-consuming. Alternatively, the internal combustion engine can also be controlled or regulated purely on a model-based basis, for example based on Gaussian process models. While this procedure entails less effort in terms of parameterization, it does place considerable demands on the computing power and data storage space of a control unit intended for the operation of the internal combustion engine.

What is needed in the art is a control device for an internal combustion engine, an internal combustion engine arrangement with an internal combustion engine and such a control device, a method for operating an internal combustion engine, and a method for determining a component characteristic map, wherein the cited disadvantages are at least reduced, optionally eliminated.

SUMMARY OF THE INVENTION

The invention relates to a control device for an internal combustion engine, an internal combustion engine assembly including an internal combustion engine, and a control device of this type, a method for operating an internal combustion engine and a method for determining a component characteristic map.

The present invention provides a control device for an internal combustion engine, including a flow path module which is arranged to receive a specified value for a flow path parameter of a flow path of the internal combustion engine. The control device is also arranged to determine a control specification for a control element of the flow path subject to the specified value, using at least one component characteristic map of at least one component of the flow path. By determining the control specification for the control element by using the at least one component characteristic map, extensive parameterization can be advantageously dispensed with. In particular, there is no requirement for time-consuming measurement of an engine on the test bench; instead, data that has been determined for the relevant component of the flow path—especially during the component trial or on the component test bench—can be used in a simple and cost-effective way. At the same time, the approach proposed here does not require particularly high computing power, especially compared to a purely model-based control or regulation based on Gaussian process models or hyperspace control. Adapting the control device to a new type of internal combustion engine is advantageously simple: only determining the flow path design and the components present in it is required, wherein then component characteristic maps assigned to the components can then be relied upon, optionally without the need for new measurements. In particular, the design of the control device can be compiled for virtually every new internal combustion engine based on the components used and from the known and, in particular, one-time previously measured component characteristic maps.

The control device is structured and arranged to control the control element using the control specification.

In the context of the present technical teaching, a flow path is understood in particular to be a region of the internal combustion engine which is permeated by the at least one gas flow, and wherein the flow path includes at least one component affecting the gas flow and at least one control element, optionally a plurality of control elements, affecting the gas flow.

In the context of the present technical teaching, a component of the flow path is understood in particular as an element of the flow path which, beyond a mere guiding or conducting function, has influence over the gas flow in the flow path or interacts with the gas flow. This can, in particular be an active component or a passive component, wherein a passive component is understood to be a component that interacts with the gas flow but cannot itself be actively controlled in order to influence the gas flow, whereas an active component can be controlled to influence the gas flow in a certain way. In particular, the at least one control element is an active component of the flow path. The component is specifically selected from a group consisting of: a radiator; a turbine; a compressor; and a valve or throttle device, especially a throttle valve.

According to one design, the flow path is in particular an air path for supply of combustion air into a combustion chamber of the internal combustion engine, or an exhaust gas path for discharge of exhaust gas from the combustion chamber. According to one design, the flow path is in particular a gas path as a combination of an air path and an exhaust gas path. In particular, the flow path includes at least one air path component and/or at least one air path control element in order to influence the air flow in the air path, as well as at least one exhaust gas path component and/or at least one exhaust gas path control element in order to influence the exhaust gas flow in the exhaust gas path. In particular, the air path and the exhaust gas path are coupled to each other via at least one exhaust gas turbocharger, wherein a turbine of the exhaust gas turbocharger is arranged in the exhaust gas path, and wherein a compressor of the exhaust gas turbocharger which is operatively connected to the turbine is arranged in the air path.

In particular, the control specification can directly be a control variable for the control element. Alternatively, the control specification can also be a secondary setpoint specification for a subordinate control module. The subordinate control module is arranged in particular to determine a secondary control specification for the control of the at least one control element, in particular as a direct control variable for the control element, depending on the secondary setpoint specification.

In the context of the present technical teaching, a module is generally understood in particular as a functional unit which can be defined or delimited conceptually or physically, and which is arranged to perform at least one specific function. It can be a separate computing device, part of a computing device, a hardware structure, or a software structure that is arranged and intended to perform at least one specific function.

The control device is arranged in particular to determine the control specification in such a way that the flow path parameter is set to the specified value and is in particular controlled or regulated when the control element is controlled with the control specification.

The control device is arranged in particular to determine the control specification for the control element of the flow path subject to the specified value by using a plurality of component characteristic maps of a plurality of components of the flow path.

In the context of the present technical teaching, a component characteristic map is understood to be in particular a data structure, in particular a data field, which has a plurality of support points for at least one first variable, subject to at least one second variable. It is possible that the component characteristic map includes support points for exactly one first variable, subject to exactly one other variable and is thus designed as a characteristic curve. However, the component characteristic map can also be designed multidimensional. In particular, the component characteristic map is interpolation-capable. In particular, the component characteristic map is assigned a calculation rule for interpolation between the support points.

According to a further development of the present invention, it is provided that the flow path module is arranged to determine the control specification by way of a physical model of the flow path including the at least one component and the at least one component characteristic map depending on the specified value. In this way it is possible, in particular, to determine the control specification with little computational effort and at the same time with low parameterization effort. The physical model of the flow path optionally includes the arrangement of the at least one component in the flow path, in particular the arrangement of a plurality of components in the flow path, as well as mathematical relationships that describe a flow along the flow path, in particular relationships between mass flow, temperature and/or pressure values along the flow path. The effect of the at least one component, in particular on the mass flow, temperature and/or pressure of the flow in the flow path is described by the at least one component characteristic map. This, in turn, makes it possible to keep the mathematical relationships covered by the physical model simple, as more complex physical effects are considered by the at least one component characteristic map.

According to a further development of the invention, it is provided that the flow path module is arranged to determine the control specification, in that a plurality of flow path parameters along the flow path by way of the physical model and the at least one component characteristic map is established. Advantageously, the flow path module is thus able to describe the flow along the flow path in a simple manner and, in particular in a manner requiring limited computational power. In particular, the flow path module is able to calculate the flow through the flow path.

The flow path parameters are in particular selected from a pressure and a temperature along the flow path. In particular, pressure and temperature are determined for a plurality of positions along the flow path.

In particular, the flow path module is arranged to determine the control specification by systematically determining the plurality of flow path parameters along the flow path against a flow direction of a medium flowing through the flow path during operation of the internal combustion engine by way of the physical model and the at least one component characteristic map. Alternatively, or in addition, the flow path module is arranged to determine the control specification by systematically determining the plurality of flow path parameters along the flow path with the flow direction of a medium flowing through the flow path during operation of the internal combustion engine by way of the physical model and the at least one component characteristic map.

Since the calculation of the flow path parameters systematically follows the flow direction or is aligned against the direction of flow, it is possible to calculate the flow path parameters as simply and accurately as possible, and thus ultimately also to determine the control specification accordingly.

The flow path module is arranged, in particular, to determine the control specification by systematically determining a first plurality of flow path parameters along a first section of the flow path against the direction of flow of a medium flowing through the first section of the flow path during operation of the internal combustion engine by using the physical model and the at least one component characteristic map, and by simultaneously and systematically determining a second plurality of flow path parameters along a second section of the flow path, with the flow direction of the medium flowing through the second section of the flow path during operation of the internal combustion engine, on the basis of the physical model and the at least one component characteristic map. This enables in particular a simple and precise calculation of the flow path parameters and thus, at the same time, determination of the control specification.

In particular, the flow path module is arranged to determine the control specification by systematically determining a first plurality of flow path parameters along a first section of an air path from a combustion chamber inlet valve—in particular via a high-pressure intercooler and a throttle valve—to a high-pressure compressor against the flow direction of the charge air in the air path, on the bases of the physical model and the at least one component characteristic map; and at the same time by systematically determining a second plurality of flow path parameters along a second section of the air path from a low-pressure compressor—in particular via a low-pressure intercooler—to the high-pressure compressor with the flow direction of the charge air on the basis of the physical model and the at least one component characteristic map.

In one embodiment, the flow path module is arranged to determine the control specification by additionally establishing a third plurality of flow path parameters along an exhaust gas path from a low-pressure turbine to upstream of a high-pressure turbine, in particular upstream of a junction of a bypass path bypassing the high-pressure turbine into a main exhaust gas path, systematically against a flow direction of the exhaust gas in the exhaust gas path, on the basis of the physical model and the at least one component characteristic map.

According to a further development of the invention, it is provided that the flow path module is arranged to receive a boost pressure value as the specified value for a gas path as the flow path.

Alternatively, or in addition, the flow path module is arranged to determine a valve position as the control specification, in particular a target valve position, for a flow valve in the flow path. In particular, the flow path module is arranged to determine as the control specification a valve position, in particular a target valve position, for a bypass path valve in the bypass path which bypasses the high-pressure turbine of the exhaust gas turbocharger. The bypass path is also referred to as a bypass; the bypass path valve is also referred to as a bypass valve.

According to a further development of the invention, it is provided that the at least one component characteristic map is selected from a group consisting of: a low-pressure compressor characteristic map; a high-pressure compressor characteristic map; a low-pressure turbine characteristic map; a high-pressure turbine characteristic map; an intercooler characteristic map, in particular a high-pressure intercooler characteristic map; and/or a low-pressure intercooler characteristic map; a throttle valve characteristic map; and a bypass valve characteristic map.

In particular, the control device is arranged to use as the at least one component characteristic map a first compressor characteristic map, in particular a first high-pressure compressor characteristic map or a first low-pressure compressor characteristic map, wherein the first compressor characteristic map includes values assigned for a mass flow across the compressor, a speed of the compressor, and a pressure ratio over the compressor.

Alternatively, or in addition, the control device is arranged to use a second compressor characteristic map as the at least one component characteristic map, in particular a second high-pressure compressor characteristic map or a second low-pressure compressor characteristic map, wherein the second compressor characteristic map includes values assigned to each other for a compressor efficiency, the mass flow over the compressor and the speed of the compressor.

Alternatively, or in addition, the control device is arranged to use as the at least one component characteristic map a first turbine characteristic map, in particular a first high-pressure turbine characteristic map or a first low-pressure turbine characteristic map, wherein the first turbine characteristic map includes values assigned to each other for a mass flow over the turbine, a speed of the turbine, and a pressure ratio across the turbine.

Alternatively, or in addition, the control device is arranged to use a second turbine characteristic map as the at least one component characteristic map, in particular a second high-pressure turbine characteristic map or a second low-pressure turbine characteristic map, wherein the second turbine characteristic map includes values assigned to each other for a turbine efficiency, the mass flow over the turbine and the speed of the turbine.

In the context of the present technical teaching, a pressure ratio over a component is understood in particular as a quotient of a pressure value measured downstream of the component divided by a pressure value measured upstream of the component.

A reduced mass flow is optionally used in the respective component characteristic map, meaning in particular, the mass flow multiplied by a quotient of an actual pressure divided by a predetermined standard pressure.

A reduced speed is optionally used in the respective component characteristic map as the speed; meaning in particular, the speed multiplied by a quotient of the actual pressure divided by the predetermined standard pressure.

In one embodiment of the control device, the flow path module is arranged to calculate a high-pressure compressor target speed subject to a boost pressure value as the specified value on the basis of at least one component characteristic map. Alternatively, or in addition, the flow path module is arranged to calculate a high-pressure compressor target capacity subject to the boost pressure value as the specified value on the basis of the at least one component characteristic map.

Alternatively, or in addition, the flow path module is arranged to calculate the control specification, in particular a valve position for a bypass valve of a bypass, bypassing a high-pressure turbine, depending on at least one target value of a high-pressure compressor, on the basis of at least one additional component characteristic map. The high-pressure compressor target value is selected in particular from the high-pressure compressor target speed, a speed manipulated variable calculated by a speed regulator from the high-pressure compressor target speed, and the high-pressure compressor target capacity.

In one design, the boost pressure value is used as the specified value to control the flow path parameter. In another design, the boost pressure value is specified as the target boost pressure for a boost pressure regulator, wherein a boost pressure control variable calculated by the boost pressure regulator is used as a control variable to determine the control specification.

In particular, according to one design, the flow path module is arranged to—based on a high-pressure intercooler characteristic map, a throttle valve characteristic map and optionally an air mass flow—calculate an air pressure value in the air path upstream of the throttle valve and downstream of a high-pressure compressor, subject to a boost pressure value as the default value. The flow path module is moreover arranged to calculate an air pressure value and an air temperature value in the air path upstream of the high pressure compressor based on an ambient pressure, an ambient temperature, a low pressure compressor characteristic map, a low pressure intercooler characteristic map, optionally a low pressure compressor actual speed, a temperature of a cooling circuit upstream of the low pressure intercooler, and the air mass flow. The flow path module is moreover arranged to calculate a high pressure compressor target speed and/or—in particular facilitated via an air temperature value upstream of the throttle valve and downstream of the high-pressure compressor—a high-pressure compressor target capacity based on the air pressure value upstream of the throttle valve and downstream of the high pressure compressor, the air pressure value and the air temperature value upstream of the high pressure compressor, optionally the air mass flow, a high pressure compressor actual speed and a high pressure compressor characteristic map.

Alternatively or additionally, the flow path module is arranged to calculate an exhaust gas pressure value and an exhaust gas temperature value downstream of a low-pressure turbine and an exhaust gas mass flow on the basis of a low-pressure turbine characteristic map, an exhaust gas pressure value and an exhaust gas temperature value upstream of the low-pressure turbine and downstream of a high-pressure turbine. The flow path module is further arranged to determine a target valve position as the control position for a bypass valve in a bypass bypassing the high-pressure turbine on the basis of the exhaust gas temperature value and the exhaust gas pressure value upstream of the low-pressure turbine and downstream of the high-pressure turbine, a high-pressure compressor actual speed, the exhaust gas mass flow, and an exhaust gas pressure value and an exhaust gas temperature value upstream of the high-pressure turbine on the basis of a high-pressure turbine map.

In particular, the flow path module is arranged to determine the exhaust gas pressure value upstream of the high-pressure turbine—in particular by way of a bisection method—on the basis of the high-pressure compressor target capacity and a measured high-pressure compressor actual capacity of the high-pressure compressor.

According to a further development of the invention, it is provided that the flow path module is arranged to use as the at least one component characteristic map a component characteristic map created from measured values of a component assigned to the component characteristic map and adapted to test bench data of an internal combustion engine including said component. In this way, particularly accurate values can be obtained for the component characteristic map with even little parameterization effort, especially values suitable for the combustion engine. In an optional design, the component characteristic map is adapted to the test bench data of the internal combustion engine including said components, by scaling characteristic map axes.

Alternatively, the flow path module is arranged to use as the at least one component characteristic map a component characteristic map obtained from predetermined support points and test bench data of an internal combustion engine including the component assigned to the component characteristic map. This also represents a simple and accurate possibility to obtain the component characteristic map, especially if it is not possible or expedient to adapt the originally measured component characteristic map to the internal combustion engine, in particular by simply scaling the characteristic map axes. Corner points of the component characteristic map are optionally defined as the predetermined support points, wherein additionally, the functions linking support points are also determined, which are then adapted to the test bench data in order to obtain the component characteristic map.

According to a further development of the invention, it is provided that the flow path module has a controller which is arranged to determine a regulating manipulated variable depending on the specified value, wherein the flow path module is arranged to determine the control specification depending on the regulating manipulated variable. In this way, the flow path parameter is advantageously adjusted to the specified value as the target value.

In one embodiment, the flow path module has a first controller, arranged to determine a controller manipulated variable as the regulating manipulated variable depending on the specified value used as the setpoint for the first controller, wherein the flow path module is arranged to determine the control specification depending on the controller manipulated variable. In this way, the flow path parameter is immediately adjusted to the specified value as the target value.

In another embodiment, the flow path module is designed to generate a pilot control variable depending on the specified value, based on the at least one component characteristic map, wherein the flow path module additionally has a second controller which is arranged—subject to the specified value used as the setpoint for the second controller—to generate a differential control variable as the regulating manipulated variable that is offset with the pilot control variable to obtain the control specification. In this way, in particular, differential control of the flow path parameters is realized.

The first controller or the second controller are advantageously designed as linear controllers. In particular, the use of the at least one component characteristic map leads to a linearization of the control of the flow path parameter, so that a linear controller with simple and, in particular, non-operating point dependent parameterization can be used. Non-linear and especially operating point dependent effects are considered by the at least one component characteristic map. In the context of the present technical teaching, a linear controller is understood in particular to be a controller in which the generated control variable depends linearly on the controller input, in this case in particular on a control deviation of the specified value.

In one embodiment, the controller, especially the first controller or the second controller, is designed as a proportional regulator (P controller), a proportional-differential controller (PD controller), a proportional-integral controller (PI controller), or a proportional-integral-differential controller (PID controller).

Alternatively, the flow path module is arranged to control the flow path parameter subject to the specified value. In this case, the flow path module does not have a controller to control the flow path parameter.

According to a further development of the invention, it is provided that the flow path module is arranged to receive at least one measured value that was measured in the flow path during operation of the internal combustion engine and to adapt the at least one component characteristic map depending on the at least one measured value. Thus, the component characteristic map can be advantageously adapted to the actual operation of the internal combustion engine, in particular to aging, dirt, wear or similar issues.

In one embodiment of the control device, the flow path module is arranged to adapt the characteristic map by changing at least one scaling factor for scaling a characteristic map axis, depending on the at least one measured value. A local scaling factor is therein optionally used for at least one characteristic map axis, in other words, in particular a scaling factor that is not globally specified for the entire characteristic map axis, but rather depends on the location on the characteristic map axis. Specifically, a local scale factor is used for each characteristic map axis of the component characteristic map. In this way, the component characteristic map can be adapted advantageously with high flexibility and accuracy.

The change or adaptation of at least one scaling factor occurs optionally according to the method of the smallest squares.

Component characteristic maps can be adapted, in particular, independently of each other, at least for certain different components of the flow path. In particular, a separate adaptation procedure is then implemented for each component characteristic map. Other components of the flow path can be adapted together or in combination with each other, especially if there are too few measured values or measuring points available for separate adaptation. For example, a low-pressure turbine and a high-pressure turbine can be adapted in combination with each other if no measuring point for pressure, temperature and/or mass flow between the two turbines is available. The same applies for example to a high-pressure compressor and a low-pressure compressor.

In particular, two scaling factors are changed for a compressor and for a turbine as a component, in particular a first scaling factor for the mass flow and a second scaling factor for efficiency.

In particular, the adaptation is only performed in stationary operating conditions of the flow path. A stationary operating state of the flow path is understood in particular to be a state wherein all existing exhaust gas turbochargers of the flow path are in a stationary state. A stationary state of an exhaust gas turbocharger is understood to mean that the speed of the exhaust gas turbocharger over a predetermined time horizon deviates from its average value within the predetermined time horizon by no more than a predetermined percentage.

According to a further development of the invention, it is provided that the control device has a higher-level control module that is arranged to determine the specified value and to pass it to the flow path module. Alternatively, or in addition, the higher-level control module is arranged to receive the control specification from the flow path module. The higher-level control module is arranged in particular to directly control the internal combustion engine. In particular, the higher-level control module is arranged especially for model-based predictive control of the internal combustion engine. The control module calculates in particular the specified value, transfers it to the flow path module, and receives the control specification from the flow path module, which it then uses to control the internal combustion engine.

In one embodiment, the flow path module is arranged to deliver at least one feedback, selected from at least one limiting value and at least one limiting curve, to the higher-level control module. In this way, limitations of the flow path in the control of the internal combustion engine can be advantageously considered by the higher-level control module.

In one embodiment, the control device is arranged to control the throttle valve for control of the boost pressure when controlling the boost pressure via the bypass valve alone is no longer possible, especially if the boost pressure cannot be lowered further. The changeover from bypass valve control to throttle valve control occurs in particular when the bypass valve is completely open, and a predetermined mean control deviation has prevailed over an initial predetermined period of time. Changeover back from throttle valve control to bypass valve control occurs in the same manner, when the throttle valve is fully open and a predetermined second mean control deviation has prevailed over a predetermined second period of time. The first predetermined period of time and the second predetermined period of time can be identical or different from each other. Accordingly, the first mean control deviation and the second mean control deviation can be identical or different from each other.

The present invention also provides an internal combustion engine arrangement, including an internal combustion engine and a control device according to the present invention, or a control device according to one or several of the embodiments described above. Particular advantages arise in connection with the combustion engine arrangement, which were already explained previously in connection with the control device.

In particular, the control device is operatively connected with the internal combustion engine and is arranged to control—in particular regulate—the internal combustion engine.

The internal combustion engine includes as its flow path in particular an air path and/or an exhaust gas path, in particular an air path and an exhaust gas path that is operatively connected with the air path via at least one exhaust gas turbocharger.

In one embodiment, the internal combustion engine has at least one low-pressure exhaust gas turbocharger and one high-pressure exhaust gas turbocharger. In one embodiment, the internal combustion engine has two low-pressure exhaust gas turbochargers arranged parallel to each other in terms of flow technology and one high-pressure exhaust gas turbocharger; wherein in particular two partial air mass flows flowing parallel to each other through the two low-pressure compressors of the low-pressure exhaust gas turbochargers upstream of a high-pressure compressor of the high-pressure exhaust gas turbocharger are combined to form an air mass flow; and wherein an exhaust gas mass flow passing through the high-pressure turbine of the high-pressure exhaust gas turbocharger branches downstream of the high-pressure turbine into two partial exhaust gas mass flows passing parallel to one another through the low-pressure turbines of the low-pressure exhaust gas turbochargers.

In particular, the exhaust gas path has a bypass path, bypassing the turbine of the exhaust gas turbocharger, in particular the high-pressure turbine of the high-pressure exhaust gas turbocharger, which is also referred to as a bypass, wherein a bypass path valve, also known as a bypass valve, is arranged in the bypass path. A proportion of the exhaust gas mass flow flowing over the bypass path and at the same time the boost pressure can be adjusted via a valve position of the bypass path valve.

In one embodiment, the internal combustion engine is designed as a reciprocating piston engine. The internal combustion engine is designed in particular as a gas engine, a diesel engine, a gasoline engine or a multi-fuel engine, in particular, a dual-fuel engine. In one embodiment, the internal combustion engine is designed as a four-stroke engine. In one embodiment, the internal combustion engine is designed as a medium-speed engine.

The problem is also met in that a method for operating an internal combustion engine is created, which hereinafter is also referred to as an operating method, wherein a specified value for a flow path parameter of a flow path of the internal combustion engine is specified, and wherein a control specification for a control element of the flow path is determined subject to the specified value by using at least one component characteristic map of at least one component of the flow path, in particular, in order to adjust the flow path parameter to the specified value. Advantages result in connection with the operating method which were explained previously in connection with the control device or the internal combustion engine arrangement.

The control device is structured and arranged to control the control element using the control specification.

In one embodiment of the method, the control specification is determined on the basis of a physical model of the flow path including the at least one component and the at least one component characteristic map depending on the specified value.

In one embodiment of the method, the control specification is determined by determining a plurality of flow path parameters along the flow path—in particular systematically against a flow direction and/or with the flow direction of a medium flowing through the flow path during operation of the internal combustion engine—on the basis of the physical model and the at least one component characteristic map.

In one embodiment of the method, the specified value is a boost pressure value for a gas path as the flow path. Alternatively, or in addition, a position for a flow valve in the flow path, in particular for a bypass valve in a bypass bypassing a high-pressure turbine of an exhaust gas turbocharger, is determined as the control specification.

In one embodiment of the method, a characteristic map is used as the at least one component characteristic map, which is selected from a group consisting of: a low-pressure compressor characteristic map; a high-pressure compressor characteristic map; a low-pressure turbine characteristic map; a high-pressure turbine characteristic map; an intercooler characteristic map, in particular a high-pressure intercooler characteristic map; and/or a low-pressure intercooler characteristic map; a throttle valve characteristic map; and a bypass valve characteristic map.

In one embodiment of the method, a component characteristic map is used as the at least one component characteristic map, which is created from measured values of a component assigned to the component characteristic map and adapted to test bench data of an internal combustion engine including the component, or which is obtained from predetermined support points and test bench data of an internal combustion engine including the component assigned to the component characteristic map.

In one embodiment of the method, the flow path parameter is regulated to the specified value by using a controller to calculate a regulating manipulated variable depending on the specified value, wherein the control specification is determined depending on the regulating manipulated variable. In particular, an embodiment of the method regulates the flow path parameter directly to the specified value by calculating a controller manipulated variable from the specified value by way of a controller, wherein the control specification is determined depending on the controller manipulated variable. Alternatively, a differential control is implemented by calculating a pilot control variable on the basis of the at least one component characteristic map depending on the specified value, wherein a controller is also used to calculate a differential control variable depending on the specified value, which is offset against the pilot control variable in order to obtain the control specification. Alternatively, the flow path parameter is controlled depending on the specified value.

In one embodiment of the method, the at least one component characteristic map is adapted depending on at least one measured value measured at the flow path during operation of the internal combustion engine. In particular, the component characteristic map is adapted during operation of the internal combustion engine.

In one embodiment of the method, the throttle valve is controlled to regulate the boost pressure if it is no longer possible to control the boost pressure via the bypass valve alone, especially if the boost pressure cannot be lowered further. Changeover occurs in particular as explained above in connection with the control device.

The present invention also provides a method, hereinafter also referred to as a determination method, for determining a component characteristic map for use in an operating method according to the present invention or an operating method according to one or several of the embodiments described above, wherein the component characteristic map is created from measured values of a component assigned to the component characteristic map and is adapted to test bench data of an internal combustion engine, including the component. Alternatively, the component characteristic map is established from predetermined support points and test bench data of an internal combustion engine including the component assigned to the component characteristic map. Advantages result in connection with the determination method that were already explained in connection with the control device, the internal combustion engine arrangement or the operating method.

The predetermined support points of the component characteristic map are optionally defined, wherein the functions linking the support points are additionally determined, which are then adapted to the test bench data in order to obtain the component characteristic map.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 7A, 7B are a schematic representation of a second part of the method according to one of the FIG. 3, 4A, 4B, or 5.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
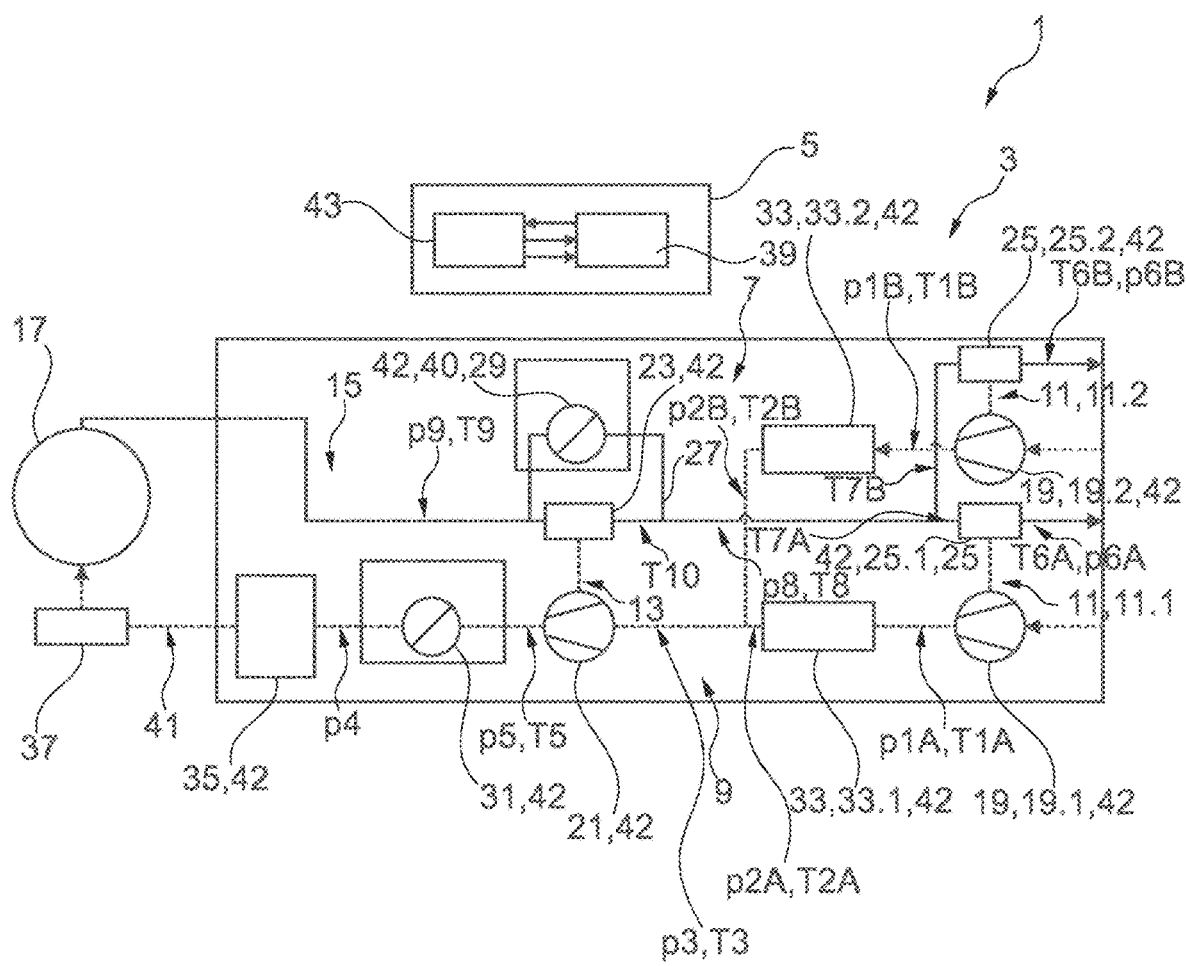
FIG. 1 is a schematic representation of a design example of an internal combustion engine arrangement with an internal combustion engine and a design example of a control device.

FIG. 1 provides a schematic representation of a design example of an internal combustion engine arrangement 1 with an internal combustion engine 3 and a design example of a control device 5. Control device 5 is operatively connected with internal combustion engine 3 in a manner not explicitly described here and is arranged to control internal combustion engine 3, in particular to regulate it.

Internal combustion engine 3 has a flow path 7, in particular an air path 9 and an exhaust gas path 15 which is operatively connected with air path 9 via at least one exhaust gas turbocharger 11, 13. Air path 9 is arranged to supply combustion air to at least one combustion chamber 17 of internal combustion engine 3. Exhaust gas path 15 is arranged to remove exhaust gas from the at least one combustion chamber 17. Internal combustion engine 3 optionally has a plurality of combustion chambers 17, especially in the form of at least one cylinder bank. In particular, one design example of internal combustion engine 3 has a plurality of cylinder banks, in particular a first cylinder bank and a second cylinder bank. Internal combustion engine 3 is designed in particular, as a V-engine.

In flow path 7, internal combustion engine 3 has, in particular, two low-pressure exhaust gas turbochargers 11, namely a first low-pressure exhaust gas turbocharger 11.1 and a second low-pressure exhaust gas turbocharger 11.2, which are arranged parallel to one another in terms of flow, and a high-pressure exhaust gas turbocharger 13, wherein, in particular, two partial air mass flows flowing parallel to one another through a low-pressure compressor 19 of low-pressure exhaust gas turbochargers 11, namely a first low-pressure compressor 19.1 and a second low-pressure compressor 19.2, are combined upstream of a high-pressure compressor 21 of high-pressure exhaust gas turbocharger 13, and wherein an exhaust gas mass flow passing through a high-pressure turbine 23 of the high-pressure exhaust gas turbocharger 13 branches downstream of high-pressure turbine 23 into two partial exhaust gas mass flows, passing through low-pressure turbines 25 of the low-pressure exhaust gas turbocharger 11, namely a first low-pressure turbine 25.1 and a second low-pressure turbine 25.2.

Exhaust gas path 15 has a bypass path or bypass 27, bypassing high-pressure turbine 23, wherein a bypass path valve or bypass valve 29 is arranged in bypass 27. A position of bypass valve 29 can be used to adjust the proportion of exhaust gas mass flow passing through the bypass and at the same time, a boost pressure in air path 9.

Throttle valve 31 is located in air path 9, downstream of high-pressure compressor 21.

Moreover, located in air path 9, downstream of low-pressure compressor 19, is a low-pressure intercooler 33, in particular a first low-pressure intercooler 33.1 downstream of the first low-pressure compressor 19.1 and a second low-pressure intercooler 33.2 downstream of the second low-pressure compressor 19.2. Located downstream of high-pressure compressor 21, in particular downstream of throttle valve 31, is a high-pressure intercooler 35.

In the context of the present technical teaching, a boost pressure is understood in particular to be the pressure that is present in air path 9 downstream of high-pressure intercooler 35 and upstream of combustion chamber 17, in particular upstream of an intake valve device 37.

Figure 2:
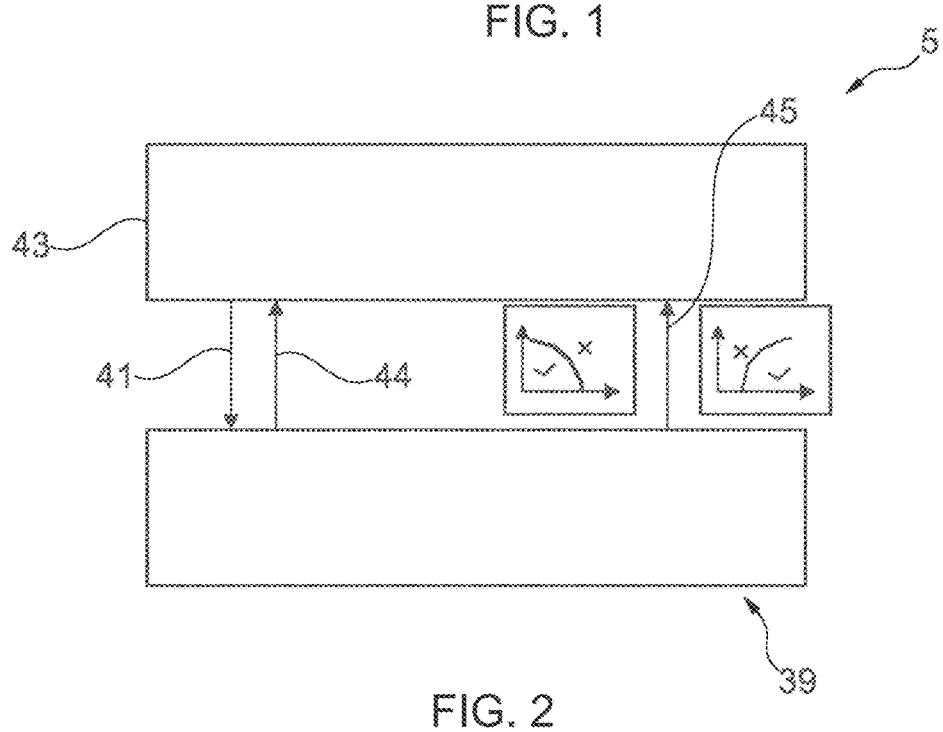
FIG. 2 is a schematic representation of a design example of the control device.

Control device 5 includes a flow path module 39 which is arranged to receive a specified value 41—see in particular FIG. 2—for a flow path parameter of flow path 7, in particular a boost pressure value for the boost pressure and a control specification 44 for a control element 40 of flow path 7, in particular bypass valve 29, depending on the specified value, using at least one component characteristic map of at least one component 42 of the flow path 7, in particular to adjust the flow path parameter to the specified value. Control device 5 is structured and arranged to control the control element 40 using the control specification 44.

FIG. 2 shows a schematic representation of a design example of control device 5. In particular, control device 5 includes a higher-level control module 43, which is arranged to determine specified value 41 and deliver it to flow path module 39. Higher level control module 43 is arranged in particular to directly control internal combustion engine 3. Higher-level control module 43 is arranged in particular, for model-based predictive control of internal combustion engine 3. In particular, control module 43 calculates specified value 41, transfers it to flow path module 39, and receives control specification 44 from flow path module 39, which it then uses to control internal combustion engine 3.

Flow path module 39 is optionally arranged to provide at least one feedback 45, selected from at least one limit value and at least one limiting curve, such as a pump characteristic curve or a valve limit stop, to the higher-level control module 43.

Figure 3:
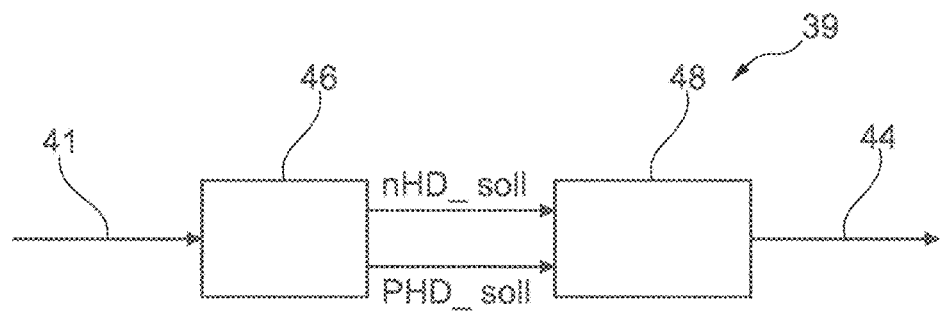
FIG. 3 is a schematic representation of a first example of a method for operating the internal combustion engine.

FIG. 3 shows a schematic representation of a first design example of a method for operating internal combustion engine 3. Flow path module 39 is arranged in particular to calculate a high-pressure compressor target speed nHD_soll depending on a boost pressure value as the specified value 41 on the basis of at least one component characteristic map 46. Moreover, flow path module 39 is arranged to calculate a high-pressure compressor target capacity PHD_soll depending on the boost pressure value on the basis of at least one component characteristic map 46.

Flow path module 39 is also arranged to calculate control specification 44, in particular as the valve position for bypass valve 29, depending on the high-pressure compressor target speed nHD_soll and/or the high-pressure compressor target capacity PHD_soll on the basis of at least one additional component characteristic map 48.

In this first design example, the boost pressure value is used as specified value 41 for control of the boost pressure.

Figure 4A:
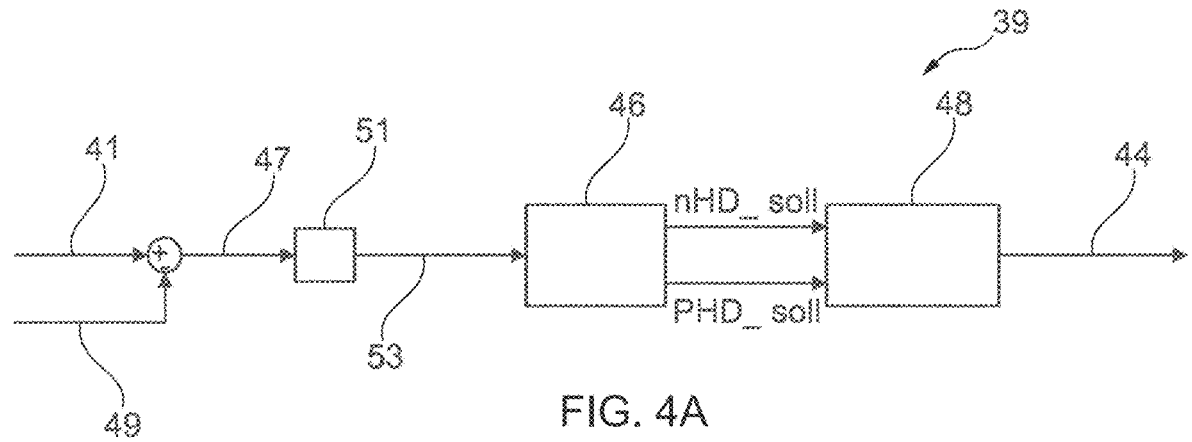
FIGS. 4A, 4B are a schematic representation of a second design example of a method for operating the internal combustion engine.
Figure 4B:
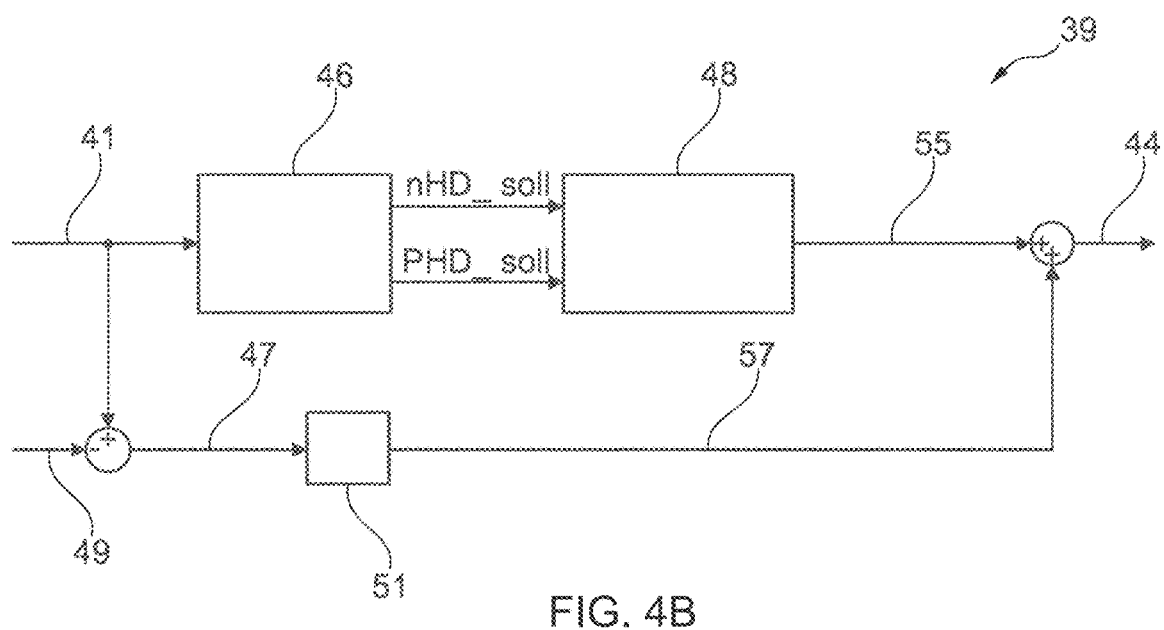

FIGS. 4A, 4B show a schematic representation of a second design example of a method for operating internal combustion engine 3 by adjustment of the boost pressure in two designs.

A first embodiment of the second design example is shown under FIG. 4A, in which a control deviation 47 of specified value 41—which is set as the target boost pressure—from an actual boost pressure 49 is input into a controller 51 which is designed as a boost pressure regulator, wherein a controller manipulated variable 53 calculated by controller 51 or boost pressure manipulated variable is used as a control manipulated variable for determining control specification 44. The boost pressure is thus adjusted directly to specified value 41.

In FIG. 4B, a second embodiment of the second design example is shown, in which a pilot control variable 55 is calculated depending on the boost pressure value as the preset value 41 on the basis of the at least one component characteristic map 46, 48, wherein at the same time control deviation 47 calculated from specified value 41 and actual boost pressure 49 is supplied to additionally provided controller 51, wherein a differential regulating manipulated variable 57 is calculated by controller 51 as the regulating manipulated variable, which is offset against pilot control variable 55 in order to obtain control specification 44. In this way, differential control of the boost pressure is realized.

Figure 5:
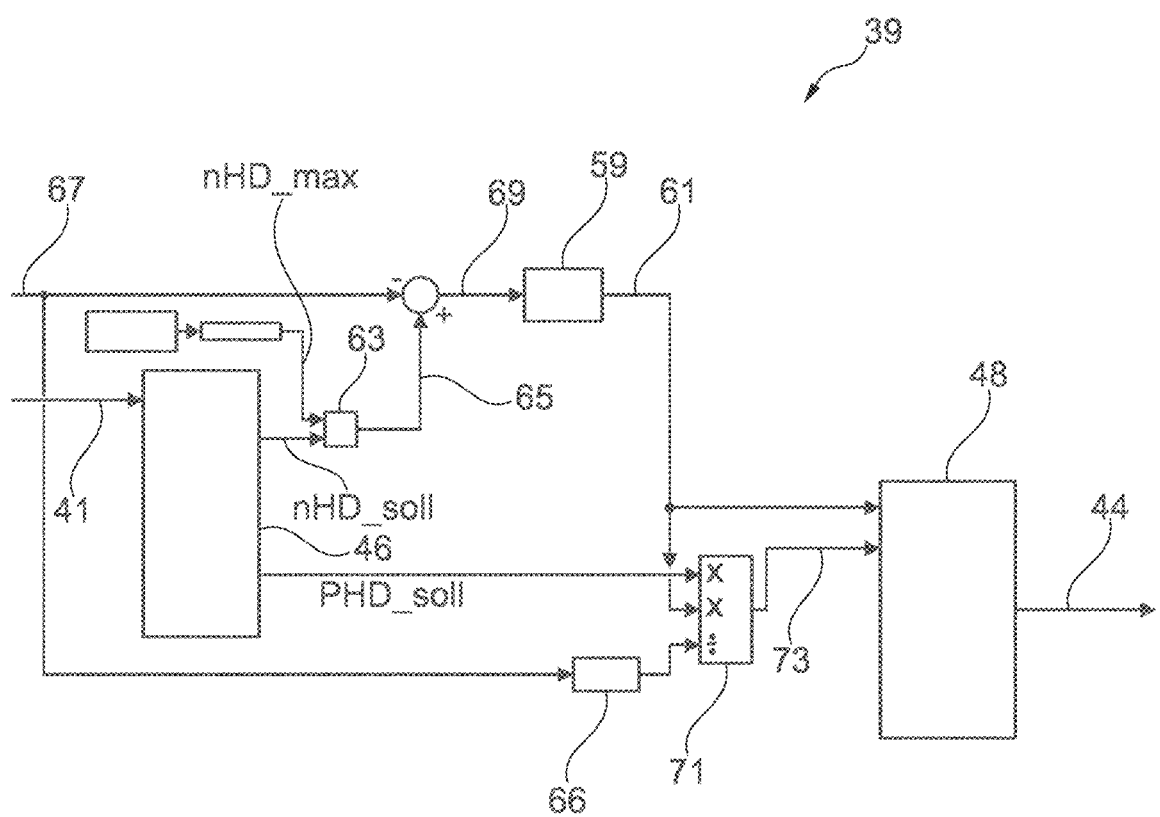
FIG. 5 is a schematic representation of a third design example of a method for operating the internal combustion engine.

FIG. 5 shows a schematic representation of a third design example of a method for operating internal combustion engine 3.

In this third design example, flow path module 39 is arranged to calculate control specification 44 depending on a speed manipulated variable 61, calculated from high-pressure compressor target speed nHD_soll by a speed regulator 59, and optionally the high-pressure compressor target capacity PHD_soll, using the at least one additional component characteristic map 48.

In particular, the high-pressure compressor target speed nHD_soll is limited to a maximum target speed nHD_max by a limiting element 63, wherein a limited target speed of 65 is obtained; from limited target speed 65 and an actual speed 67, a speed control deviation 69 is calculated, which is used as input variable in speed regulator 59. In an optional design, high-pressure compressor target capacity PHD_soll is also calculated for the purpose of calculating the control specification 44 with actual speed 67 and speed manipulated variable 61 in a first calculation element 71, from which an equivalent high-pressure compressor target capacity 73 is obtained. A monitoring element 66 is provided to prevent division by zero in first calculation element 71.

Figure 6:
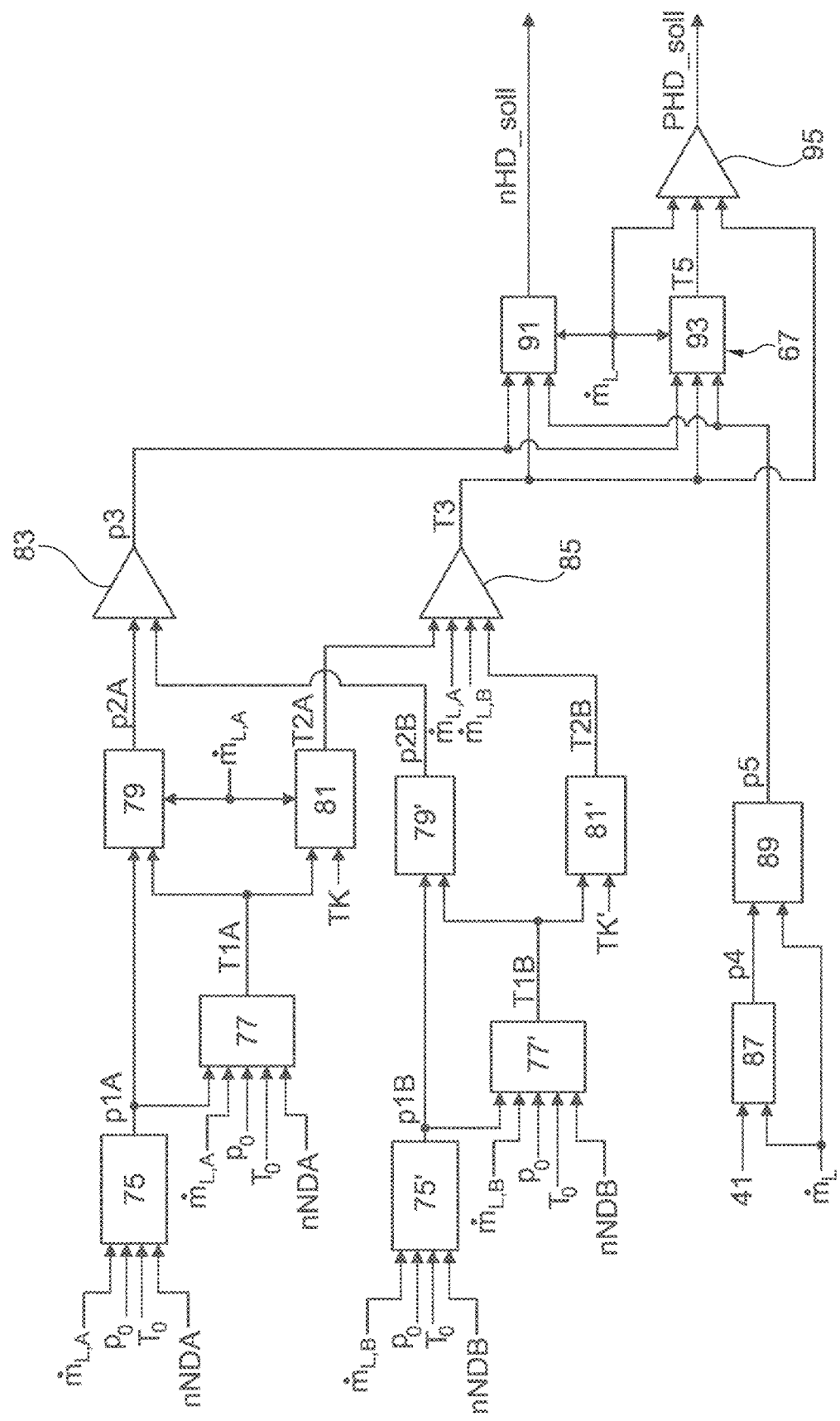
FIG. 6 is a schematic representation of a first part of the method according to one of the FIG. 3, 4A, 4B, or 5.

FIG. 6 shows a schematic representation of the first part of the method according to one of FIG. 3, 4A, 4B, or 5.

By way of a plurality of component characteristic maps, FIG. 6 explains in particular the calculation of the high-pressure compressor target speed nHD_soll and the high-pressure compressor target capacity PHD_soll depending on the boost pressure value as a default value of 41.

The process described here and in FIGS. 7A, 7B is designed for an internal combustion engine 3, including two low-pressure exhaust gas turbochargers 11, wherein the partial air paths and partial exhaust gas paths assigned to them are designated as A-side and B-side according to a common nomenclature. Insofar as the calculations for the A-side and the B-side are equivalent, they will be explained only for the A-side by way of example. For the sake of simplicity, the illustration for the B-side is either not explicitly shown, or provided with deleted reference markings, wherein reference is made respectively to the explanation for the A-side. In particular, internal combustion engine 3 has the structure shown in FIG. 1. For a better understanding, the pressures and temperatures mentioned below are shown at the corresponding locations in FIG. 1.

First, an air mass flow $\dot{m}_{L,A}$ on the A-side, an ambient pressure p0, an ambient temperature T0 and a low-pressure compressor speed nNDA are included in a first low-pressure compressor characteristic map 75, wherein depending on these input variables, a first air pressure p1A for the A-side downstream of first low-pressure compressor 19.1 and upstream of first low-pressure intercooler 33.1 is determined by way of first low-pressure compressor characteristic map 75. First low-pressure compressor characteristic map 75 includes assigned values for mass flow $\dot{m}_{L,A}$ across first low-pressure compressor 19.1, the low-pressure compressor speed nNDA, and a pressure ratio across first low-pressure compressor 19.1. Incorporated into a second low-pressure compressor characteristic map 77 are air mass flow $\dot{m}_{L,A}$, ambient pressure p0, ambient temperature T0, low-pressure compressor speed nNDA and first air pressure p1A, wherein, depending on these input variables, a first air temperature T1A is determined for the A-side downstream of the first low-pressure compressor 19.1 and upstream of the first low-pressure intercooler 33.1 by way of the second low-pressure compressor characteristic map 77. Second low-pressure compressor characteristic map 77 includes assigned values for a degree of efficiency of first low-pressure compressor 19.1, mass flow $\dot{m}_{L,A}$ across first low-pressure compressor 19.1 and the low-pressure compressor speed nNDA of the first low-pressure compressor 19.1.

First air pressure p1A and first air temperature T1A, together with air mass flow $\dot{m}_{L,A}$, are incorporated into a first low-pressure intercooler characteristic map 79, from which a second air pressure p2A is determined on the A-side downstream of low-pressure intercooler 33.1. First air temperature T1A, air mass flow $\dot{m}_{L,A}$ and a temperature TK of a cooling circuit upstream of first low-pressure intercooler 33.1 are incorporated into a second low-pressure intercooler characteristic map 81, from which a second air temperature T2A is determined on the A-side downstream of low-pressure intercooler 33.1.

In the context of the present technical teaching, the fact that a variable is determined from a characteristic map is understood in particular to mean that the corresponding variable is either read from the characteristic map or calculated depending on a value selected from the characteristic map.

Similarly, a second air pressure p2B and a second air temperature T2B are calculated for the B-side. The same component characteristic maps can thereby be used that are used on the A-side, in particular if identical components are used. If, in particular with regard to their type, manufacturer or design, different components are used on the A-side on the one hand and the B-side on the other, different component characteristic maps respectively assigned to each component can also be used accordingly.

In a second calculation element 83, second air pressure p2A on the A-side and second air pressure p2B on the B-side are calculated into a third air pressure p3 downstream of a union of the parallel air paths of the A-side and the B-side upstream of high-pressure compressor 21, in particular as an arithmetic mean value according to the following equation:

$$p3 = \frac{1}{2}(p2A + p2B). \tag{1}$$

In a third calculation element 85, second air temperature T2A on the A-side and second air temperature T2B on the B-side are calculated with the air mass flow $\dot{m}_{L,A}$ on the A-side and an air mass flow $\dot{m}_{L,B}$ on the B-side to a third air temperature T3 downstream of the union of the parallel air paths of the A-side and the B-side upstream of high-pressure compressor 21, in particular according to the following equation:

$$T3 = \frac{1}{\dot{m}_{L,A} + \dot{m}_{L,B}}(T2A \cdot \dot{m}_{L,A} + T2B \cdot \dot{m}_{L,B}). \tag{2}$$

To this point, the calculation is carried out systematically along the flow direction of the charge air.

Another part of the calculation occurs systematically against the direction of flow of the charge air: a total air mass flow $\dot{m}_L$, which results as the sum of the air mass flow $\dot{m}_{L,A}$ on the A-side and the air mass flow $\dot{m}_{L,B}$ on the B-side, as well as the boost pressure value as the default value 41, are incorporated into a high-pressure intercooler characteristic map 87, from which a fourth air pressure p4 downstream of throttle valve 31 and upstream of high-pressure intercooler 35 is determined. Fourth air pressure p4, together with the total air mass flow $\dot{m}_L$ are incorporated into a throttle valve characteristic map 89, from which a fifth air pressure p5 is determined—not to be confused with the boost pressure often referred to in the same way according to a convention; in the context of the present teaching, the designation only serves to ensure consistency in the numbering of the various pressure values—downstream of high-pressure compressor 21 and upstream of throttle valve 31. In the simplest case, however, it is also possible that fourth air pressure p4 and fifth air pressure p5 are equated if it is assumed that throttle valve 31 is always completely open during normal operation of internal combustion engine 3.

Third air pressure p3, third air temperature T3, fifth air pressure p5 and total mass flow $\dot{m}_L$ are now incorporated in a first high-pressure compressor characteristic map 91, from which the high-pressure compressor target speed nHD_soll is determined. First high-pressure compressor characteristic map 91 includes assigned values for total mass flow $\dot{m}_L$ across high-pressure compressor 21, the speed of high-pressure compressor 21, and a pressure ratio across high-pressure compressor 21.

Total air mass flow $\dot{m}_L$, third air pressure p3, third air temperature T3, fifth air pressure p5 and actual speed 67 of high-pressure compressor 21 are incorporated into a second high-pressure compressor characteristic map 93, from which a fifth air temperature T5—also designated as such for consistency reasons—is determined downstream of high-pressure compressor 21 and upstream of throttle valve 31. Second high-pressure compressor characteristic map 93 includes assigned values for a degree of efficiency of high-pressure compressor 21, total air mass flow $\dot{m}_L$ across high-pressure compressor 21 and the speed of high-pressure compressor 21.

Third air temperature T3, fifth air temperature T5 and total air mass flow $\dot{m}_L$ are offset in a fourth calculation element 95 to high-pressure compressor target capacity PHD_soll, in particular according to the following equation:

$$\text{PHD\_soll} = \dot{m}_L(T_5 - T_3)K_l\left(\frac{T_3 + T_5}{2}\right), \quad (3)$$

with a characteristic curve $K_1$ as a function of the mean value of $T_3$ and $T_5$.

FIG. 7A, 7B show a schematic representation of a second part of the method according to one of FIG. 3, 4A, 4B, or 5.

FIGS. 7A, 7B illustrate in particular the calculation of control specification 44 on the basis of high-pressure compressor target capacity PHD_soll and high-pressure compressor target speed nHD_soll obtained according to FIG. 6 with the help of a plurality of component characteristic maps.

As shown in (a), a first exhaust gas temperature T6A and a first exhaust gas pressure p6A downstream of first low-pressure turbine 25.1, a second exhaust gas temperature T7A upstream of first low-pressure turbine 25.1, an exhaust gas mass flow $\dot{m}_{g,A}$ (always on the A-side), the low-pressure compressor speed nNDA, which is also the speed of first low-pressure turbine 25.1 of first exhaust gas turbocharger 11.1, and a first value of a second exhaust gas pressure p8 upstream of a branching into two partial exhaust gas paths of the A-side and the B-side, and downstream of a union of the partial exhaust gas flows on the one hand through bypass 27 and on the other hand through high-pressure turbine 23, are incorporated into a first low-pressure turbine characteristic map 97, from which a second value for second exhaust gas pressure p8 is determined. During the calculation, that is, during operation of the method, the second value for second exhaust gas pressure p8 is returned to first low-pressure turbine characteristic map 97 as the new first value; the calculation of the second exhaust gas pressure p8 is thus done iteratively.

Second exhaust gas temperature T7A is calculated from a second low-pressure turbine characteristic map 99, into which first exhaust gas temperature T6A, first exhaust gas pressure p6A, second exhaust pressure p8 and low-pressure compressor speed nNDA are incorporated. Second exhaust gas temperature T7A is also calculated iteratively, since second exhaust gas pressure p8 is incorporated in its calculation, which in turn requires second exhaust gas temperature T7A for its calculation. In an analogous manner, a second exhaust gas temperature T7B is calculated for the B-side, optionally by way of the same second low-pressure turbine characteristic map 99.

Second exhaust gas pressure p8, second exhaust gas temperature T7B for the B-side, a first exhaust gas pressure p6B for the B-side and low-pressure compressor speed nNDB of second exhaust gas turbocharger 11.2, which is also the speed of second low-pressure turbine 25.2, are incorporated into a third low-pressure turbine characteristic map 101, from which an exhaust mass flow $\dot{m}_{g,B}$ for the B-side is determined. Exhaust gas mass flow $\dot{m}_{g,A}$ for the A-side is calculated in a fifth calculation element 103 from a total exhaust mass flow $\dot{m}_g$ and the exhaust mass flow $\dot{m}_{g,B}$ for the B-side, in particular according to the following equation:

$$\dot{m}_{g,A} = \dot{m}_g - \dot{m}_{g,B}. \quad (4)$$

A third exhaust gas temperature T8 upstream of the branching into the two partial exhaust gas paths of the A-side and the B-side and downstream of the union of the partial exhaust gas flows on the one hand by way of bypass 27 and on the other hand by way of high-pressure turbine 23 is calculated in a sixth calculation element 105 depending on second exhaust gas temperature T7A for the A-side, second exhaust gas temperature T7B for the B-side, exhaust mass flow $\dot{m}_{g,A}$ for the A-side and the exhaust mass flow $\dot{m}_{g,B}$ for the B-side, in particular according to the following equation:

$$T8 = \frac{1}{\dot{m}_{g,A} + \dot{m}_{g,B}}(T7A \cdot \dot{m}_{g,A} + T7B \cdot \dot{m}_{g,B}). \quad (5)$$

As shown in (b), third exhaust pressure p8, a fourth exhaust pressure p9 and a measured fourth exhaust gas temperature T9 upstream of the branching into the partial exhaust gas flows on the one hand through bypass 27 and on the other hand through high-pressure turbine 23, and high-pressure compressor target speed nHD_soll are now input into a first high-pressure turbine characteristic map 107, from which an exhaust mass flow $\dot{m}_{g,T}$ is determined via high-pressure turbine 23. Exhaust gas mass flow $\dot{m}_{g,T}$ via high-pressure turbine 23 and total exhaust mass flow $\dot{m}_g$ are incorporated into a seventh calculation element 109, in which they are calculated to form an exhaust mass flow $\dot{m}_{g,U}$ through bypass 27, in particular according to the following equation:

$$\dot{m}_{g,U} = \dot{m}_g - \dot{m}_{g,T}. \quad (6)$$

Fourth exhaust gas pressure p9 is determined in an eighth calculation element 111 in a bisection method by comparing a high-pressure compressor actual capacity PHD_ist with the high-pressure compressor target capacity PHD_soll.

Exhaust gas mass flow $\dot{m}_{g,U}$ through bypass 27, exhaust gas mass flow $\dot{m}_{g,T}$ through high-pressure turbine 23, third exhaust gas temperature T8 and fourth exhaust gas temperature T9 are incorporated into a ninth calculation element 113, in which a fifth exhaust gas temperature T10 is calculated immediately downstream of high-pressure turbine 23 and upstream of the union of the partial exhaust gas flows on the one hand through bypass 27 and on the other hand through high-pressure turbine 23, in particular according to the following equation:

$$T10 = \frac{\dot{m}_{g,T}}{\dot{m}_{g,U}}(T8 - T9) + T8. \quad (7)$$

Fifth exhaust gas temperature T10, fourth exhaust gas temperature T9 and exhaust gas mass flow $\dot{m}_{g,T}$ through high-pressure turbine 23 are incorporated into a second high-pressure compressor characteristic map 115, from which the actual high-pressure compressor capacity is determined PHD_ist.

From the eighth calculation element 111, a target mass flow $\dot{m}_{g,U,soll}$ is also obtained through bypass 27, which, together with fourth exhaust pressure p9, fourth exhaust gas temperature T9, and third exhaust pressure p8, is incorporated into a third high-pressure compressor characteristic map 117, from which control specification 44 is ultimately obtained.

Insofar as the variables mentioned in particular in connection with FIGS. 6 and 7 are not determined from a characteristic map, calculated by way of a calculation element or otherwise explicitly determined, they are optionally specified by the higher-level control module 43, in particular as measured variables or as variables obtained from a model or a simulation.

Insofar as variables are determined iteratively, a predetermined starting value is optionally specified for them at the beginning of the procedure, in particular by the higher-level control module 43. In particular, the corresponding variables are initialized with the respective predetermined starting value.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control device for an internal combustion engine, the control device comprising:
a flow path module which is configured for:
receiving a specified value for a flow path parameter of a flow path of the internal combustion engine; and
determining a control specification for a control element of the flow path, the control specification being determined depending on the specified value and being determined using at least one component characteristic map, the at least one component characteristic map being of at least one component of a bypass of the flow path, the bypass bypassing a high pressure turbine of an exhaust gas turbocharger upstream of a low pressure turbine of another exhaust gas turbocharger; and
a higher-level control module that is configured for determining the specified value and for passing the specified value to the flow path module, the flow path module being further configured for delivering at least one feedback to the higher-level control module, wherein the at least one feedback is selected from at least one limiting value and at least one limiting curve.

2. The control device according to claim 1, wherein the control device is configured to control the control element using the control specification.

3. The control device according to claim 1, wherein the flow path module is configured for determining the control specification by way of a physical model of the flow path including the at least one component and the at least one component characteristic map subject to the specified value.

4. The control device according to claim 3, wherein the flow path module is configured for determining the control specification in that, along the flow path, a plurality of the flow path parameter are determined by way of the physical model and the at least one component characteristic map.

5. The control device according to claim 3, wherein the flow path module is configured for determining the control specification in that along the flow path—at least one of systematically against a flow direction and systematically with the flow direction of a medium flowing through the flow path during operation of the internal combustion engine—a plurality of the flow path parameter are determined by way of the physical model and the at least one component characteristic map.

6. The control device according to claim 1, wherein the flow path module is configured for at least one of:
receiving, as the specified value, a boost pressure value for a gas path as the flow path; and
determining, as the control specification, a valve position for a flow valve in the flow path bypassing the high pressure turbine of the exhaust gas turbocharger.

7. The control device according to claim 1, wherein the flow path module is configured for at least one of:
receiving, as the specified value, a boost pressure value for a gas path as the flow path; and
determining, as the control specification, a valve position for a bypass valve in the bypass bypassing the high pressure turbine of the exhaust gas turbocharger.

8. The control device according to claim 1, wherein the at least one component characteristic map is a bypass valve characteristic map.

9. The control device according to claim 1, wherein the at least one component characteristic map:
(a) is created from a plurality of measured values of the at least one component assigned to the at least one component characteristic map and is adapted to test bench data of the internal combustion engine including the at least one component; or
(b) is obtained from a plurality of predetermined support points and test bench data of the internal combustion engine including the at least one component which is assigned to the at least one component characteristic map.

10. The control device according to claim 1, wherein the flow path module includes a controller which is configured for determining a regulating manipulated variable depending on the specified value, wherein the flow path module is configured for determining the control specification subject to the regulating manipulated variable.

11. The control device according to claim 1, wherein the flow path module is configured for:
- receiving at least one measured value that was measured in the flow path during operation of the internal combustion engine; and
- adapting the at least one component characteristic map depending on the at least one measured value.

12. An internal combustion engine arrangement, comprising:
- an internal combustion engine; and
- a control device, which includes:
  - a flow path module which is configured for:
    - receiving a specified value for a flow path parameter of a flow path of the internal combustion engine; and
    - determining a control specification for a control element of the flow path, the control specification being determined depending on the specified value and being determined using at least one component characteristic map, the at least one component characteristic map being of at least one component of a bypass of the flow path, the bypass bypassing a high pressure turbine of an exhaust gas turbocharger upstream of a low pressure turbine of another exhaust gas turbocharger; and
  - a higher-level control module that is configured for determining the specified value and for passing the specified value to the flow path module, the flow path module being further configured for delivering at least one feedback to the higher-level control module, wherein the at least one feedback is selected from at least one limiting value and at least one limiting curve.

13. A method for operating an internal combustion engine, the method comprising the steps of:
- receiving, by way of a flow path module of a control device of the internal combustion engine, a specified value for a flow path parameter of a flow path of the internal combustion engine; and
- determining, by way of the flow path module, a control specification for a control element of the flow path, the control specification being determined depending on the specified value and being determined using at least one component characteristic map, the at least one component characteristic map being of at least one component of a bypass of the flow path, the bypass bypassing a high pressure turbine of an exhaust gas turbocharger upstream of a low pressure turbine of another exhaust gas turbocharger, the control device including a higher-level control module that is configured for determining the specified value and for passing the specified value to the flow path module, the flow path module being configured for delivering at least one feedback to the higher-level control module, wherein the at least one feedback is selected from at least one limiting value and at least one limiting curve.

14. The method according to claim 13, wherein the at least one component characteristic map is:
- (a) created from a plurality of measured values of the at least one component assigned to the at least one component characteristic map and is adapted to test bench data of the internal combustion engine including the at least one component; or
- (b) established from a plurality of predetermined support points and test bench data of the internal combustion engine including the at least one component which is assigned to the at least one component characteristic map.

15. The method according to claim 13, wherein the control device is configured to control the control element using the control specification.

* * * * *